US012519287B2

(12) United States Patent
Kearns et al.

(10) Patent No.: US 12,519,287 B2
(45) Date of Patent: Jan. 6, 2026

(54) VCSEL WITH ANISOTROPIC CURVED MIRROR

(71) Applicant: Sony Group Corporation, Tokyo (JP)

(72) Inventors: Jared Alexander Kearns, Kanagawa (JP); Tatsushi Hamaguchi, Kanagawa (JP); Kentaro Hayashi, Kanagawa (JP); Rintaro Koda, Tokyo (JP)

(73) Assignee: Sony Group Corporation, Tokyo (JP)

( * ) Notice: Subject to any disclaimer, the term of this patent is extended or adjusted under 35 U.S.C. 154(b) by 745 days.

(21) Appl. No.: 17/709,914

(22) Filed: Mar. 31, 2022

(65) Prior Publication Data

US 2023/0318262 A1  Oct. 5, 2023

(51) Int. Cl.
*H01S 5/183* (2006.01)

(52) U.S. Cl.
CPC ...... *H01S 5/18394* (2013.01); *H01S 5/18361* (2013.01); *H01S 5/18388* (2013.01)

(58) Field of Classification Search
CPC .................................................. H01S 5/18361
See application file for complete search history.

(56) References Cited

U.S. PATENT DOCUMENTS

| | | | | |
|---|---|---|---|---|
| 2002/0163688 | A1* | 11/2002 | Zhu | H04B 10/503 398/91 |
| 2007/0280320 | A1* | 12/2007 | Feezell | H01S 5/18341 372/46.01 |
| 2009/0262770 | A1* | 10/2009 | Itoh | H01S 5/18322 372/45.01 |
| 2011/0182314 | A1 | 7/2011 | Yoshikawa et al. | |
| 2023/0057446 | A1 | 2/2023 | Hayashi et al. | |
| 2024/0120711 | A1 | 4/2024 | Hayashi et al. | |

FOREIGN PATENT DOCUMENTS

| | | | | |
|---|---|---|---|---|
| WO | WO-2021140803 A1 * | 7/2021 | ........... | H01S 5/0207 |
| WO | WO2022/176434 A1 | 8/2022 | | |

OTHER PUBLICATIONS

Moench: "High power VCSEL systems for tailored intensity distributions", Vertical-Cavity Surface-Emitting Lasers XV, SPIE, 1000, vol. 7952, No. 1, Feb. 10, 2011, pp. 1-11, XP060010711 (In the IDS) (Year: 2011).*
Translation of Hamaguchi (Year: 2021).*
Search Report issued in International Patent Application No. PCT/JP2023/008377, mailed Jun. 14, 2023. 4 pages.
Written Opinion issued in International Patent Application No. PCT/JP2023/008377, mailed Jun. 14, 2023. 10 pages.
Moench, Holger, et al., "High power VCSEL systems for tailored intensity distributions," Vertical-Cavity Surface-Emitting Lasers XV, vol. 7952, pp. 35-45. SPIE, 2011. 12 pages.

* cited by examiner

*Primary Examiner* — Minsun O Harvey
*Assistant Examiner* — Stephen Sutton Kotter
(74) *Attorney, Agent, or Firm* — K&L Gates LLP

(57) ABSTRACT

The present disclosure provides new and innovative VCSEL devices and systems. In an example, a VCSEL device comprises a cavity mirror with a curved mirror surface of a VCSEL and a radius of curvature (ROC) of the curved mirror surface that is anisotropic, wherein the ROC comprises four directions, the four directions being +x, +y, −x, −y, the ROC in at least one direction is in a range greater than a cavity length of the VCSEL and less than a predefined ROC value for a standard beam width (ROCUL), and the ROC in at least one of the other directions is outside the range.

20 Claims, 11 Drawing Sheets

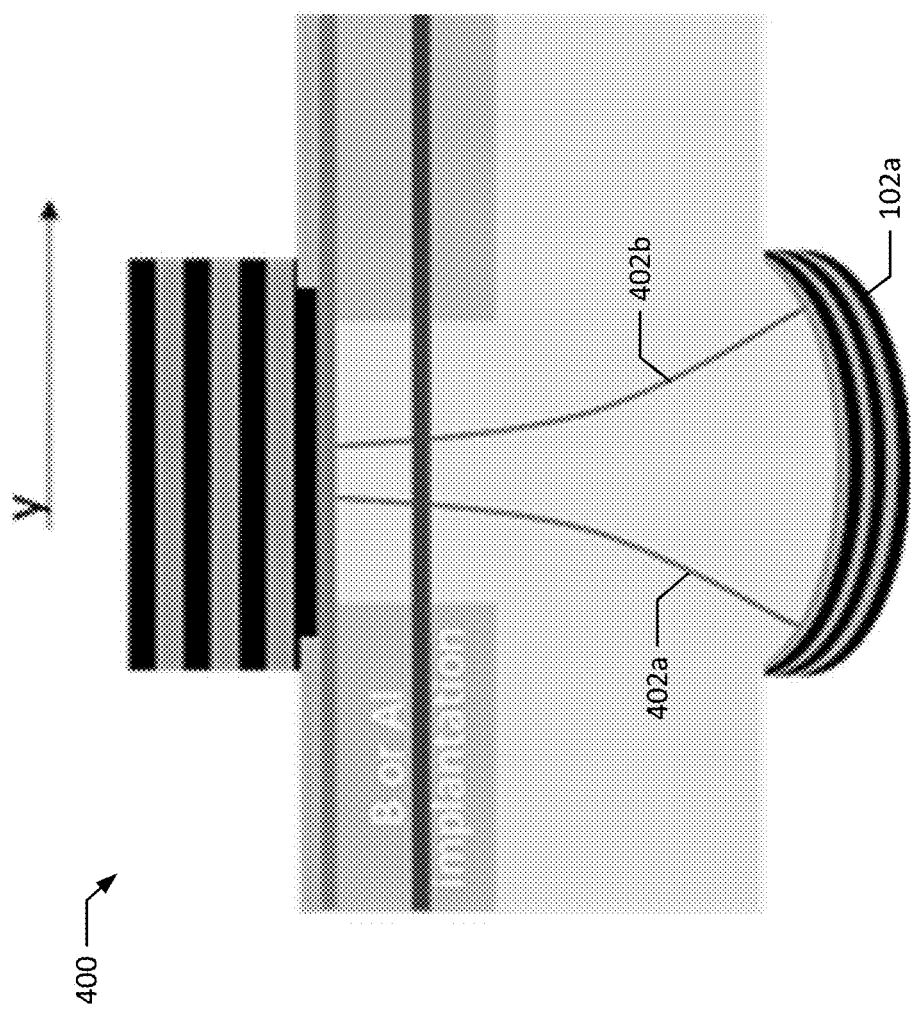

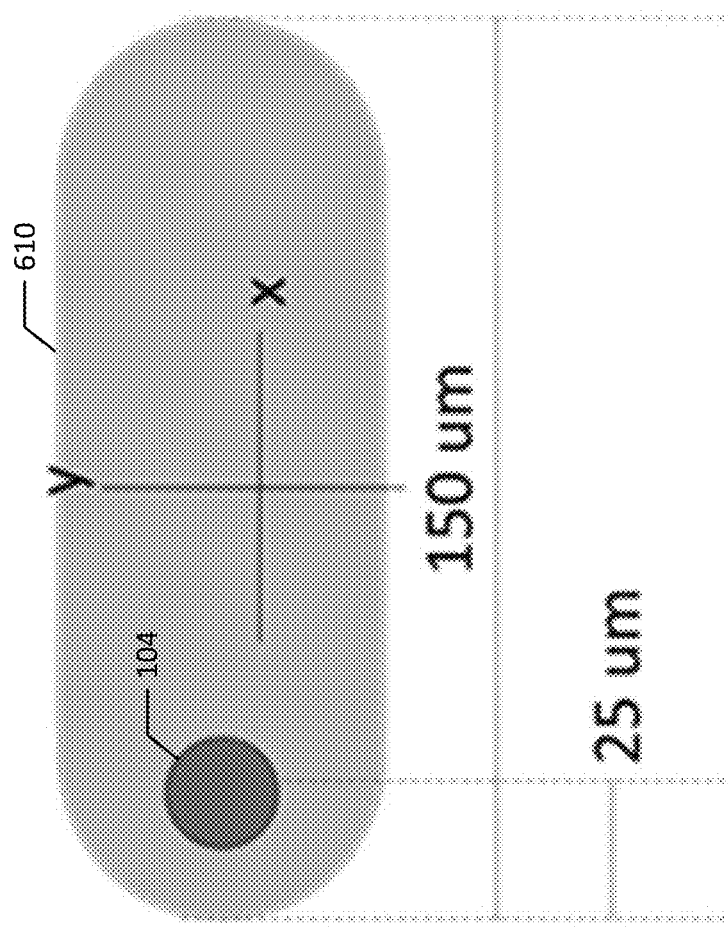
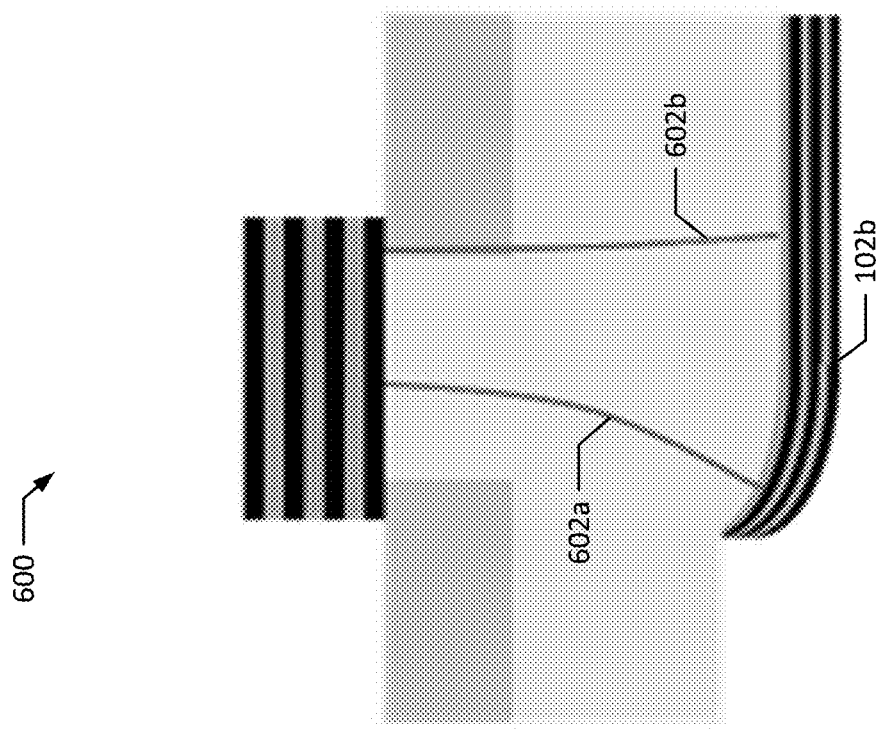
Fig. 6B
Fig. 6A

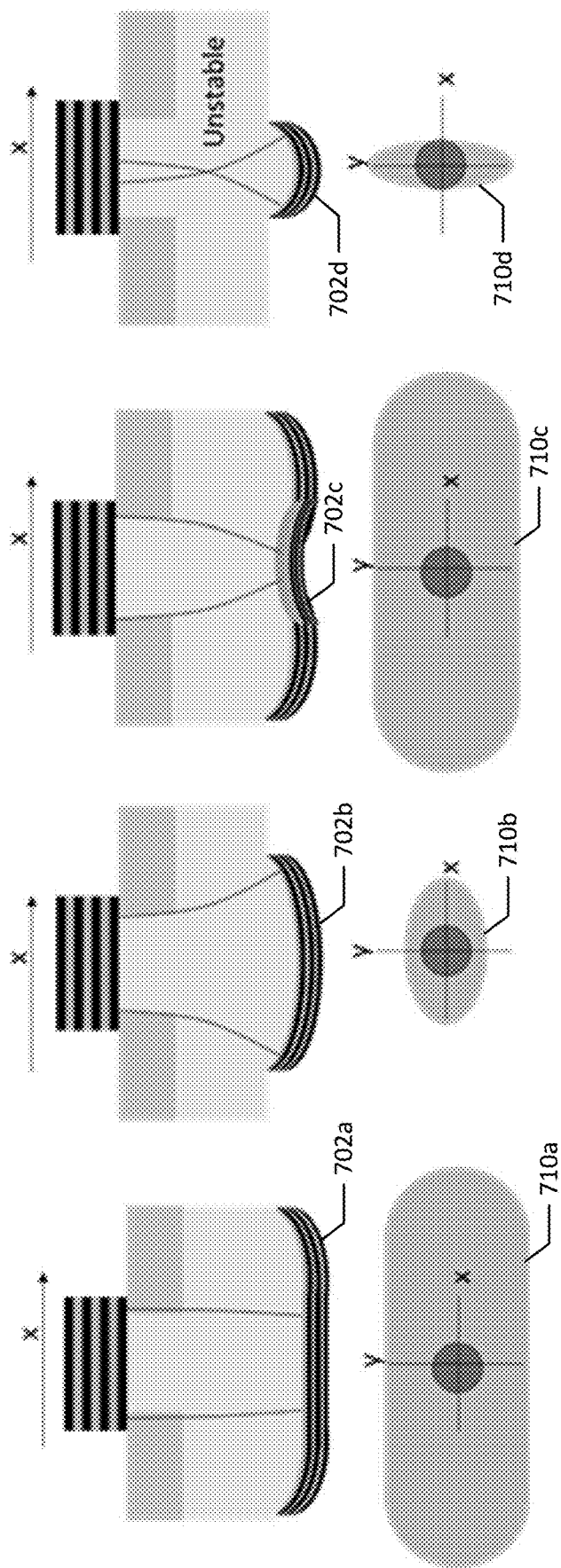

VCSEL WITH ANISOTROPIC CURVED MIRROR

BACKGROUND

The present disclosure generally relates to light-emitting elements and light-emitting devise that include a vertical-cavity surface-emitting laser (VCSEL). A VCSEL as described herein may be either a vertical-cavity surface-emitting laser or a vertical-external-cavity surface-emitting laser. In a VCSEL, laser light is allowed to resonate between two light reflection layers, often distributed Bragg reflector (DBR) layers, which may be referred to as mirror layers. The VCSELs structure, including the DBR layers, cavity length, aperture size and shape, impact the emitted laser beam shape and properties.

SUMMARY

The present disclosure provides new and innovative VCSEL devices and systems. In an example, a VCSEL cavity mirror comprises a curved mirror surface of a VCSEL and a radius of curvature (ROC) of the curved mirror surface that is anisotropic, wherein the ROC comprises four directions, the four directions being +x, +y, −x, −y, the ROC in at least one direction is in a range greater than a cavity length of the VCSEL and less than a predefined ROC value for a standard beam width (ROCUL), and the ROC in at least one of the other directions is outside the range.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIG. 4 is a schematic of a cross section of a VCSEL device in a first direction, according to an example of the present disclosure.

FIG. 6A is a schematic of a cross section of a VCSEL device in a second direction, according to a second example embodiment of the present disclosure.

FIG. 6B is a schematic of a cross section of the VCSEL device of FIG. 6A in a plan view, according to the second example embodiment of the present disclosure.

FIGS. 7A-7D are schematics of a cross section of various example VCSEL devices in a second direction and corresponding plan views, according to example embodiments of the present disclosure.

DETAILED DESCRIPTION OF EXAMPLE EMBODIMENTS

Figure 1:
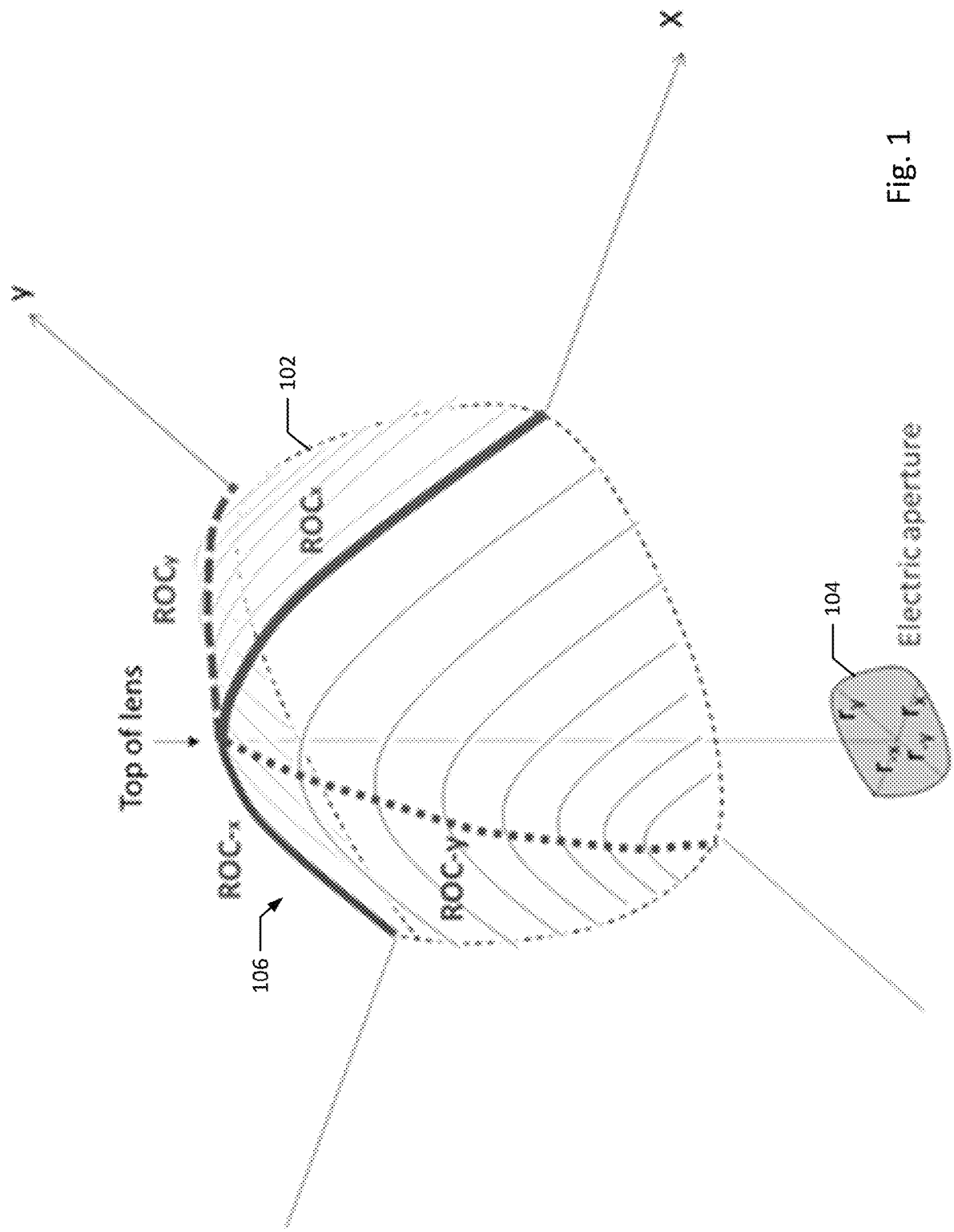
FIG. 1 is a diagram of curved mirror of a VCSEL, according to an example of the present disclosure.

VCSELs may have one or more curved mirrors or DBRs that may be configured to focus or adjust laser beam properties. In VCSELs with curved mirrors, beam properties are heavily influenced by the mirror shape, including the radius of curvature (ROC) of the mirror, which may also be referred to as a lens. Typically, mirrors in VCSELs are circularly symmetric; however, anisotropy in the mirror can have beneficial effects on controlling the mode of the VCSEL, such as enabling stable polarization.

In recent years, VCSELs with curved mirrors have been demonstrated to have good performance using the III-Nitride material system. Additionally, an ability to control a lateral mode shape through changing the mirror parameters has been shown by controlling the lateral mode with the mirror ROC. However, these devices suffer from a lack of polarization control due to the symmetry of the device, such as the circularly symmetric curved mirrors, and the symmetry in the crystal orientation. This lack of polarization preference can lead to several issues, such as: polarization switching of the device with lifetime and current; having a low polarization ratio; having a polarization ratio that changes with lifetime and current; and the polarization direction is random and must be individually measured for each device to be determined.

While there has been some limited work on VCSELs with curved mirrors, there are three primary methods by which polarization is controlled in VCSELs in general: using materials with polarization dependent gain, using a grating to induce a polarization dependence to the reflection, or breaking the symmetry of the cavity net gain/loss, such as etching of the mirror with an elliptical pattern.

To get a polarization dependence of the gain, this is typically achieved through anisotropic strain in the active region. This strain can be structurally induced or could be inherent due to the crystal orientation. Causing strain with the structure can make processing very complex and generally requires an entire redesigning of the process. For materials, such as III-Nitrides, the polarization can be induced by using the non-basal orientations. In this polar structure, the anisotropic biaxial strain in semi-polar and non-polar oriented wells leads to a splitting in the valence band such that recombination preferentially produces a single polarization. This method, however, generally requires the use of non-basal oriented substrates. These substrates are typically much more expensive and of lower quality than traditional c-plane oriented substrates.

Gratings have become a typical method for controlling the polarization for arsenide-based devices. Simply etching lines in the top of the DBR or depositing stripes of dielectric, the mirror reflectivity becomes polarization dependent, thus, promoting the lasing of the polarization with a higher reflectivity. However, the reflectivity is strongly influenced by the dimensions of the gratings and thus fine process control is required. Even more of an issue is that the grating dimensions decrease as the designed wavelength does. This means that for VCSELs emitting in the visible spectrum, e-beam lithography is typically required to form the grating, significantly increasing the fabrication complexity and time.

Finally, the mirrors or structure can be modified to introduce anisotropic loss in the cavity. This has been achieved by etching anisotropic shapes, such as ellipses, into the mirror structure. While this is a simple change or addition to the standard fabrication process, it is quite sensitive to misalignments and may also increase the loss seen by the desired lasing mode, thereby degrading the device performance.

The present disclosure addresses the above discussed problems to provide for the use of a VCSEL cavity with improved beam properties using a curved mirror that has varying radii of curvature along different axis whose relationship is defined by the electrical aperture parameters along those axes.

Generally, as discussed in the present disclosure, the top of lens or curved mirror is defined as the center of mass of the optical mode intensity for the lasing mode, or is the "highest" point of the lens, or may be considered as a point within 2 μm of the center of mass of the electrical aperture.

When referring to the axis directions as discussed in the present disclosure, the axis will be designated such that the smallest ROC of the lens is aligned with either the x or y axis. Put another way, the direction with the highest second derivative of the lens profile taken at the "top of the lens" is defined as parallel to either the x or y axis. Thus, the direction with the greatest curvature is set as x or y. For example, a lens of height z (x,y):

$$\max\left(\frac{d^2z}{dt^2}\right)\bigg|\text{top of lens}\bigg\|\vec{x} \text{ or } \vec{y}_{\frac{d^2z}{dt^2}|\text{top of lens}}\bigg\|\vec{x} \text{ or } \vec{y}.$$

Figure 2:
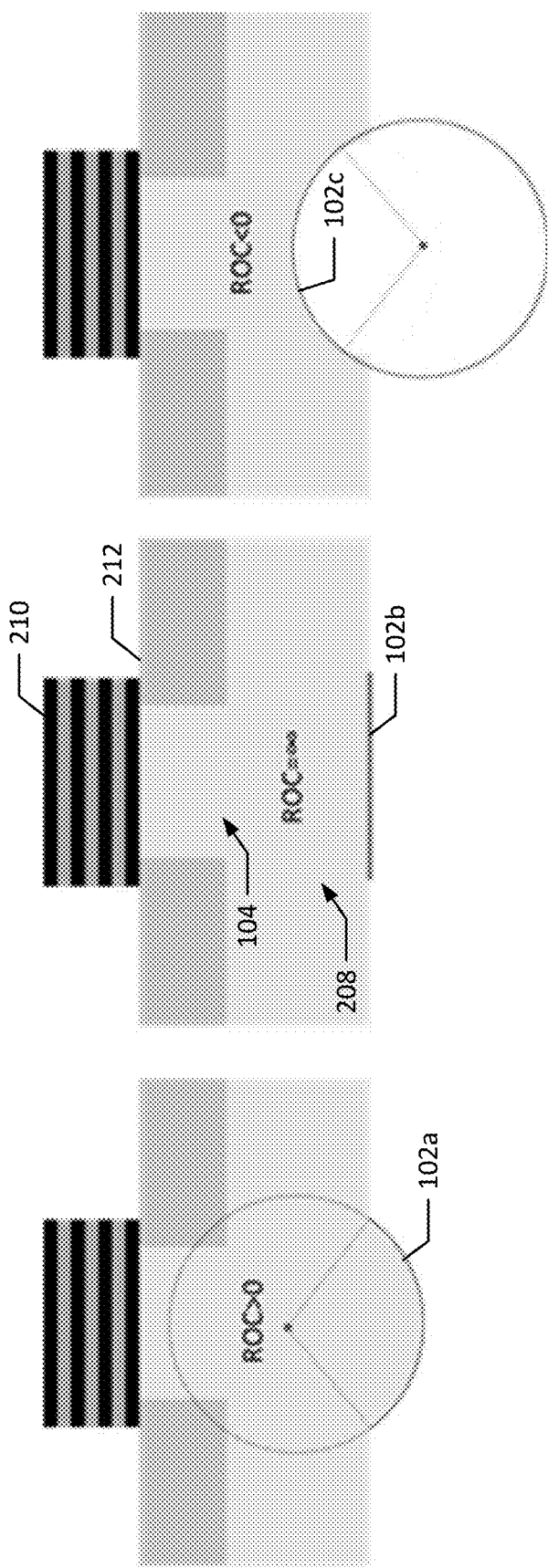
FIG. 2 is cross-sectional diagram of a VCSEL illustrating examples of radius of curvature, according to various examples of the present disclosure.

FIG. 1. shows a curved mirror 102 with different radii of curvature (ROC) 106 and the corresponding electrical aperture 104. In this case, the $ROC_{-x}$ is the smallest ROC 106 of the lens and is aligned parallel to the x axis. When defining the sign of the ROC 106, a positive value corresponds to a convex lens 102a, a value of infinity or nearly infinity will refer to a flat mirror 102b, and a negative value will refer to a concave lens 102c, as illustrated in FIG. 2. It should be appreciated that the curved mirror or lens (e.g., DBR) having the ROC 106 may have multiple layers (not shown in FIG. 2), as will be illustrated and discussed below. Also, as discussed herein, unless specifically referring to a shape of convex, nearly flat or concave for the curved mirror, the curved lens 102a, 102b, or 102c may be generally referred to as curved mirror 102.

FIG. 2 shows the different sign conventions for the ROC 106, as described in the present disclosure, in relation to a cavity 208 and flat reflector or mirror 210 (e.g., DBR) configured to emit a laser light beam from the VCSEL. The curved mirror will have ROC values $\{ROC_x, ROC_{-x}, ROC_y, ROC_{-y}\}$ as illustrated with reference to FIG. 1, such that the sign of the curvature of the mirror in some directions may be different. For example, the ROC 106 of a curved mirror may be convex in certain directions, while concave or flat in others (e.g., 102a in x direction, 102b or 102c in y direction).

In defining the difference in the ROC values, there is a threshold value termed ROCUL used herein in the present disclosure. In an example embodiment, ROCUL is the ROC 106 for which the $1/e^2$ beam width in a certain direction equals the electrical aperture diameter of the device in that direction at the vertical position of the aperture definition. For a device with an oxide defined aperture 104, this would correspond to the beam waist in the cavity 208 at the level of the oxide 212. For an aperture 104 with radii $\{r_x, r_{-x}, r_y, r_{-y}\}$ there is a corresponding ROCUL of $\{ROCUL_x, ROCUL_{-x}, ROCUL_y, ROCUL_{-y}\}$ in each direction. Mathematically, in this example, for the intensity distribution of a gaussian beam, g(x), in the direction x given by:

$$g(x) = \exp\left(-\frac{\frac{1}{2}x^2}{\sigma^2}\right)$$

The $1/e^2$ intensity is given at $=2\sigma$. Thus, ROCUL occurs when $x=2\sigma=\text{radius}_{aperture}$ (W. For a gaussian beam in a cavity 208 with a curved mirror 102 and a flat mirror 210, the beam width at the flat mirror 210, σ, is given by:

$$\sigma = \frac{1}{2}\sqrt{\frac{\lambda}{n\pi}\sqrt{LR - L^2}}$$

Where λ is the wavelength of the optical mode, n is the refractive index, L is the cavity length (between 210 and 102), and R is the radius of curvature of the curved mirror 102. Assuming that the aperture 104 is defined near the flat mirror 210, these two equations can be combined to give the following definition for ROCUL in a direction x:

$$r_{a,x} = \sqrt{\frac{\lambda}{n\pi}\sqrt{L(ROCUL_x) - L^2}}$$

In another example embodiment, ROCUL is the ROC 106 for which the 1/e beam width in a certain direction equals the electrical aperture diameter of the device in that direction at the vertical position of the aperture definition. In this example embodiment, the 1/e intensity is given at $x=\sqrt{2}\sigma$, and this different relationship carries through the above mathematical relationships. Any other suitable value for ROCUL may be used, for example, for a beam width in the range of 1/e to $1/e^2$. Thus, it should be appreciated that the relationships above may change depending upon the ROCUL set for a particular implementation, as the threshold value set as ROCUL may be dependent on the structure at hand. Moreover, the ROCUL is set such that the ROC anisotropy is different enough in different directions to produce the intended effect (e.g., polarization control) for a given structure.

As discussed herein in various examples below, the directions of the ROC 106 may be described using the following terminology: the 'S' direction corresponds to the direction that is introducing loss to the mode, the values in this direction belong in the set S; and the 'Q' direction corresponds to the direction that mirror is intended to function as normal, the values in this direction belong in the set Q.

As is understood by persons of skill in the art, the aperture 104 is defined by the lateral current confinement, and the size of the aperture 104 is determined by the effective width of the current flow at the layer that introduces the most loss or the gain region. Often the layer of most loss for the mode is the active region, however it is not necessarily the case. The metal contact, the implant, or oxide layers are all other examples of layers that may be used to define the aperture 104.

For the specific examples of the mirror shape variations expressed below, unless stated otherwise, the values given may generally correspond to the VCSEL cavity 208 described here, although this description is not intended to limit the scope of the disclosure, but merely to provide a suitable and typical example embodiment. The growth substrate is composed of GaN and the substrate orientation corresponds to the c-direction with a miscut within ±3°. The epi structure consists of n-type material, followed by an active region of 3±1 quantum wells with a peak gain at 450 nm. Above the active region a p-type layer is present. A current aperture 104 is formed by ion implantation into the p-type layer with B or Al ions. To define the aperture 104 shape and dimensions, photolithography can be used to define the pattern for an implant blocking layer, such as thick photoresist or metal. This blocking material can be placed around the aperture location to keep that area from being implanted and being electrically isolated. For embodiments where the aperture size and shape are not specified, a circular aperture 104 with a diameter of 4 μm may be used. A current spreading layer is then either grown or deposited using another n-type region with a tunnel junction contact or using a transparent conductive oxide, such as ITO, respectively. Metal contacts are deposited on the current spreader and to the n-type layer to enable electrical injection through the aperture 104. To form the optical cavity 208, the substrate is thinned, and a flat mirror 210 is deposited on one side while a curved mirror 102 is placed on the other. For example, the total cavity length may be 20 μm. The mirrors 102 may consist of alternating layers of $Ta_2O_5$ and $SiO_2$ with thicknesses of ¼ the optical wavelength in that material that corresponds to a free space wavelength of 450 nm. These layers form a dielectric distributed Bragg reflector.

In an example, the curved lens or mirror 102 is formed by applying a photo active polymer by spin coating. The polymer is then photoexcited through a mask and developed to form the designed pattern depending on the desired lens shape. The top of the mirror 102 is aligned to the center of the aperture 104. The sample is then heated to cause the polymer to reflow and form a curved shape (e.g., 102a). This curved pattern is then transferred to the GaN surface beneath the polymer by dry etching. Finally, the dielectric layers are deposited on the curved surface to form the mirror 102.

Figure 3:
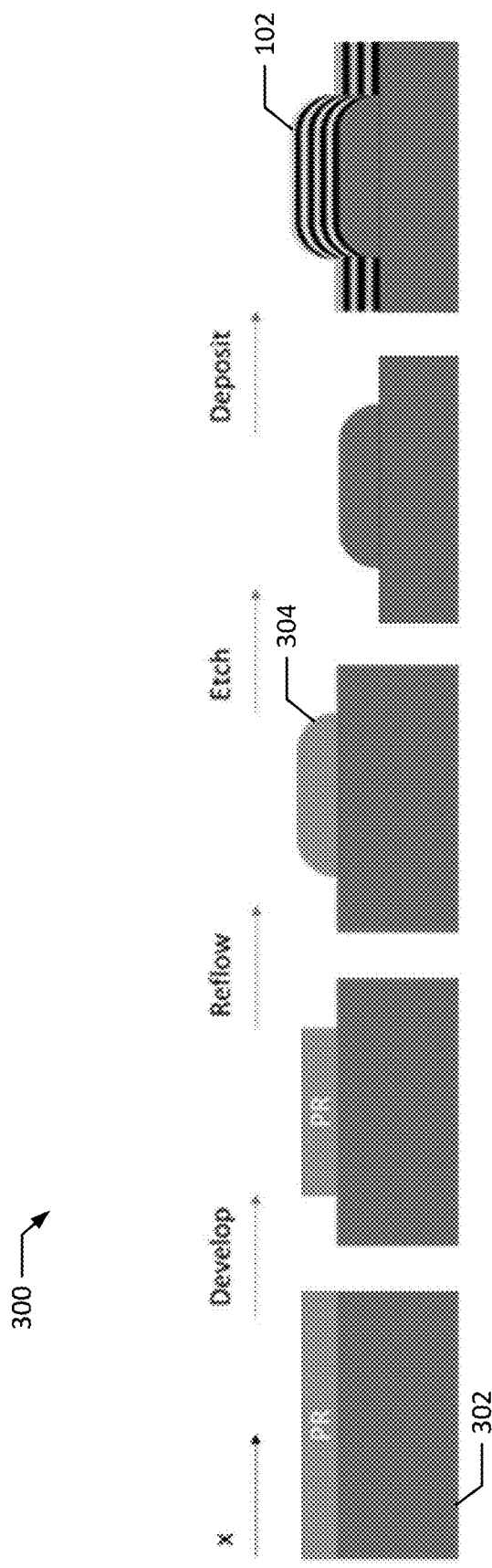
FIG. 3 is flow diagram of a process for forming a curved mirror, according to an example of the present disclosure.

Different curvatures of the mirror 102a, 102b, 102c can be achieved by changing the polymer's shape before reflowing and fluidic properties, such as viscosity or surface tension. Thus, choosing an appropriate resin is typically an important parameter in determining the optimum fabrication conditions. As described herein, the long side of a rectangular resist pattern will generally be referred to as the length, and the short side as the width of the pattern. For the case where an array is described, the same general process is used, though there are multiple apertures defined per mirror 102. FIG. 3 illustrates the general process 300 for forming a curved mirror 102 on a substrate 302 by forming a shape using photoresist 304 and etching according to a typical process, to produce a desired shape of the curved mirror 102, as discussed above. In this illustrated example of FIG. 3, the mirror 102 has a ROC of nearly infinity in the middle and approximately 70 μm at the ends.

FIG. 4 illustrates a schematic of the cross section of a VCSEL device 400 where the curved mirror 102a has a ROC 106 that is symmetric and is in the Q set in the illustrated cross section, meaning it illustrates the direction that is not intended to introduce additional loss. This direction will be parallel to the y axis for the following descriptions of embodiments of the invention. An approximated threshold of edges of the resonating mode shape is depicted by the lines 402s and 402b (e.g., half power beam width). In the illustrated example of device 400, the ROCUL is ~250 μm. In example embodiments, the cavity 208 may be an integral cavity structure of VCSEL, or an external cavity structure. In an example embodiment, the laser cavity 208 is made from GaN, InP, GaAs, or another semiconductor material. It should be appreciated that like reference numerals may be omitted where the inclusion is not necessary for interpretation or description of the structure.

Figure 5B:
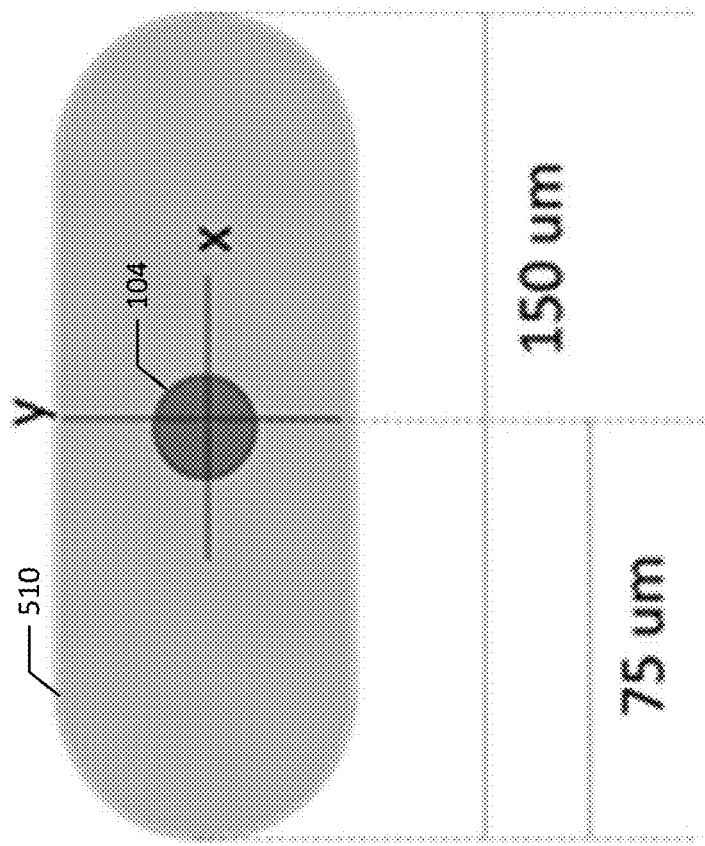
FIG. 5B is a schematic of a cross section of the VCSEL device of FIG. 5A in a plan view, according to the first example embodiment of the present disclosure.
Figure 5A:
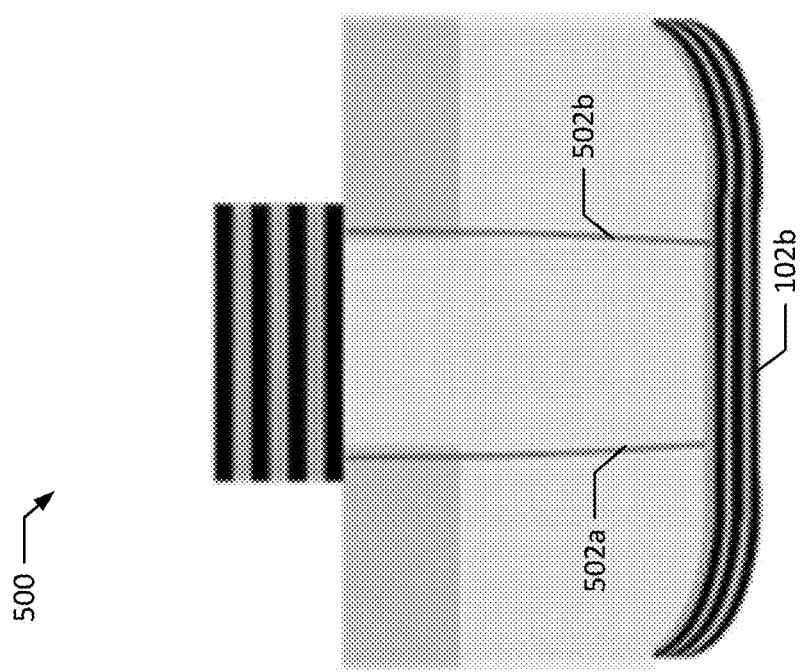
FIG. 5A is a schematic of a cross section of a VCSEL device in a second direction, according to a first example embodiment of the present disclosure.

FIG. 5A is a schematic of a cross section of a VCSEL device 500 in a second direction (e.g., x direction). FIG. 5B is a schematic of a cross section of the VCSEL device of FIG. 5A in a plan view. In a first example embodiment as shown in FIGS. 5A and 5B, the mirror 102b has a varying ROC 106 along the x direction and a constant ROC 106 along the y direction, with the outline 510 of the mirror shape being longer in the x direction (e.g., 150 μm) than in the y direction. The ROC 106 along the x direction approaches infinity in the middle of the mirror 102b where the aperture 104 is located. In other words, the mirror 102b is substantially flat along the x direction and curved along the y direction, such as would be described by a cylinder shape in three dimensions. This curvature can be achieved by creating a rectangular pattern with the polymer before reflowing, such that the long direction has sufficient length relative to the short side for the lens to flatten out along the top. For example, using an n-type photoresist with a certain viscosity and height after spinning, a mirror 102b with a total length of 150 μm and width of 50 um allows for the ROC 106 along the x direction to stabilized through the middle third of the mirror length where the aperture 104 is placed. The aperture 104 is placed in the stabilized region, such as having its center be located at 75 μm along the length of the mirror 102b. The ROC 106 along the y direction could be set at a constant value of 70 μm. An approximated threshold of edges of the resonating mode shape is depicted by the lines 502a and 502b (e.g., half power beam width).

FIG. 6A is a schematic of a cross section of a VCSEL device 600 in a second direction (e.g., x direction). FIG. 6B is a schematic of a cross section of the VCSEL device of FIG. 6A in a plan view. In a second example embodiment as shown in FIGS. 6A and 6B, in the first and last third of the mirror 102b (i.e., left and right sides), the ROC 106 in the x direction may not have stabilized. In the case where the preference for a single polarization is desired to be reduced, such as when a device with a known polarization direction and a low polarization ratio is desired, the position of the aperture 104 can be shifted to the end of the mirror 102b. In this way, the number of directions that introduce loss can be reduced. For example, if the aperture 104 is placed at the left third of the lens 102b, as shown in FIGS. 6A and 6B, then the axis direction that introduces loss is the +x direction. However, the −x direction has an ROC 106 that introduces less loss than if the aperture 104 were placed in the center of the lens 102b, thereby reducing the loss that is introduced in that direction and reducing the polarization preference for the y direction.

In other example embodiments, the difference in the ROC 106 between the Q and S directions can be changed to advantageously produce a desired level of polarization preference. In the example where the aperture 104 is placed in the center of a mirror 102b with $ROC_y$=70 μm and $ROC_x$=infinity, as similarly presented in the embodiments of FIG. 5A-6B, this structure is taken as a reference structure for the following discussion in relation to FIG. 7A-7D. In addition to adjusting the placement of the aperture 104 on the mirror 102 to change the number of axis that introduce loss, the ROC 106 of the mirror 102 in the lossy direction can be adjusted as discussed further below.

FIGS. 7A-7D are schematics of a cross section of various example VCSEL devices having different ROC values in a second direction with corresponding plan views. In an example, the $ROC_x$ can be reduced from infinity as illustrated in FIG. 7A, down to the ROCUL value, ~250 μm, as illustrated in FIG. 7B, to smoothly modulate the difference in loss between the x-polarization and the y-polarization. This mirror lens shape 702b and 710b shown in FIG. 7B may advantageously provide for a reduced polarization preference relative to the structure of FIG. 7A with mirror lens shape 702a and 710a. This could be achieved practically by reducing the length of the polymer pattern such that the mirror forms a smooth curved surface with a nearly constant second derivative near the top of the lens 102 such that a finite positive ROC 106 can be defined. This example structure of FIG. 7B could be formed by making a rectangular pattern with a length of 80 μm and a width of 50 μm.

Figure 8:
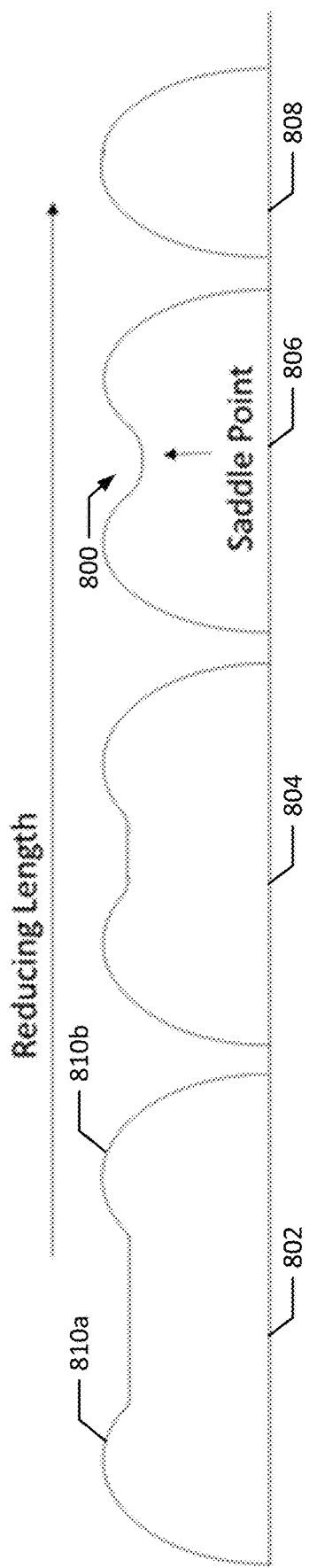
FIG. 8 is a process diagram for reducing a length to form a saddle point, according to the second example embodiment of the present disclosure.

Alternatively, in another example embodiment, the polarization preference could be further increased by using a mirror with a negative ROC value in the x direction, as shown in FIG. 7C. This could be described as a saddle point geometry of mirror lens shape 702c and 710c. Using a concave ROC 106 in the x-direction would expand the beam and lead to additional loss in terms of absorption and diffraction. Thus, the loss for the x-direction can be greatly increased, which may be advantageous for a situation in which there is low loss outside the aperture, and thus the beam needs to be significantly expanded for a sufficient loss difference to be achieved for stable polarization control. Alternatively, if the ROCUL value is sufficiently large as to make the formation of the mirror 102 with an ROC 106 greater than ROCUL difficult, as is the case with shorter cavities 208, a concave mirror 102c provides for further increasing the loss difference between directions. The fabrication of a saddle point can be created by careful consideration of the polymer length. For certain surface tension values, the end of the polymer will tend to create a bulge in the cross section after reflowing, as shown in FIG. 8. By reducing the cavity length such that the area of effect of the two raised portions 810a and 810b begin to interact, then a smoothly curving shape 800 can be formed. For example, a rectangle with a length of 100 μm and a width of 40 μm may produce such a shape.

Finally, in another example embodiment, the ROC 106 of the lossy direction can be changed to introduce significant loss through a different mechanism. Instead of increasing the ROC 106 to make the beam wider and have greater overlap with lossy areas, the ROC 106 can be reduced to be lower than the cavity length, as illustrated in FIG. 7D. By having the ROC 106 less than the cavity length, it could be viewed as the mirror "focuses too much" and leads to an unstable resonant mode. Thus, in the case where the $ROC_y$ is the standard 70 μm and the $ROC_x$ is less than the cavity length, at 15 μm for example, then only the component of the resonant mode that is aligned along the y direction is stable. This can be formed by having the length of the polymer rectangle correspond to the Q direction be at a standard value of 40 μm, whereas the width corresponds to the S direction and may be 18 μm.

For the above discussed example embodiments of FIGS. 7A-D, all of these example designs may have a $ROC_y$ of 70 μm, while FIG. 7A has a $ROC_x$ of infinity; FIG. 7B has an ROC that is less than infinity and is equal to or greater than ROCUL, such as 250 μm; FIG. 7C has a ROCK that is negative, such as −500 μm; and FIG. 7D has a $ROC_x$ that is greater than zero but less than the cavity length, such as 15 μm.

As briefly mentioned above, FIG. 8 is a process diagram for reducing a length to form a saddle point. FIG. 8 illustrates how reducing the length of the polymer rectangle can give a saddle point, for example, comparing a first length 802, to a shorter length 804, to a shorter length 806 that creates a saddle point, to an even shorter length 808. It should be appreciated that if the length is too long (e.g., 802) or too short (e.g., 808) then a saddle point is unlikely to be formed. The range of acceptable lengths can be controlled by changing the properties of the resist.

Figure 9C:
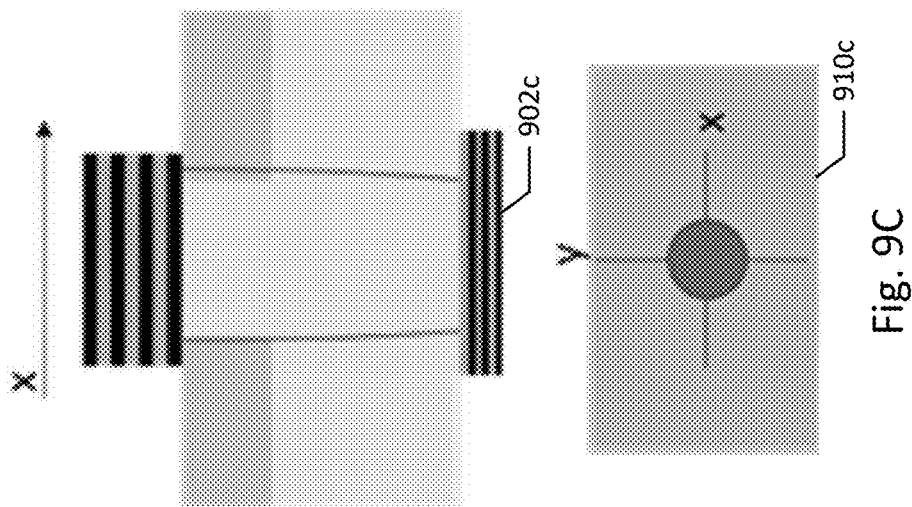
FIGS. 9A-9C are cross-sectional diagrams of a VCSEL illustrating examples of mirror footprints, according to various examples of the present disclosure.
Figure 9B:
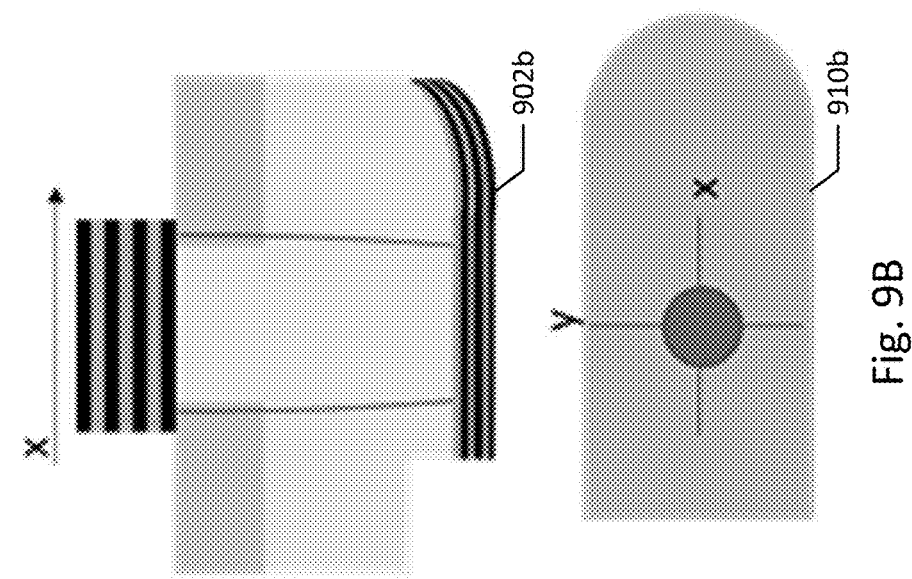
Figure 9A:
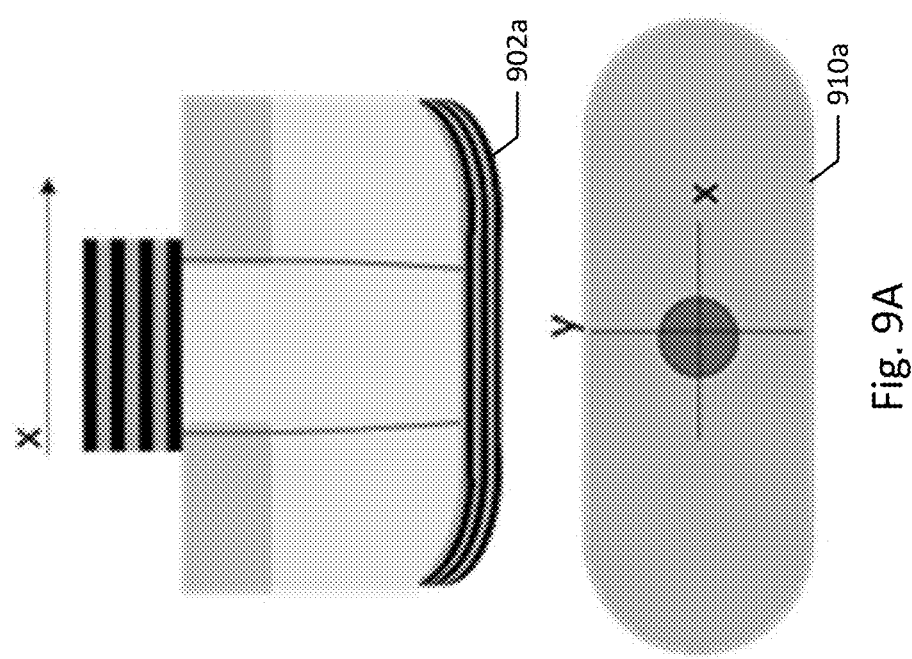

It should be noted that the ROC values near the aperture 104 are the pertinent aspect of the mirror shape for controlling beam properties and mode control. The mirror 102 has thus far been depicted with a footprint having curved edges. However, the mirror 102 may also have one or both ends truncated, as shown with reference to FIGS. 9A-C. All three structures have a $ROC_y$ that is not intended to introduce additional loss, such as 70 μm, and a $ROC_x$ of infinity (e.g., >5,000 μm). In an example embodiment, an ROC 106 of greater than 5,000 μm may be considered as substantially infinite and providing a substantially flat surface, as the ROC 106 may be provided at least one order of magnitude greater than the other direction, and preferably two orders of magnitude greater. As illustrated in FIG. 9A-C, the difference in the footprints 910a, 910b, 910c could be due to mask design impacting the reflow properties at the ends of the mirror, or it could be due to etching of certain parts of the mirror due to additional process steps. FIG. 9A shows a footprint pattern 910a in plan view and mirror shape 902a in cross sectional view for the previously described mirror shape. FIG. 9B shows a footprint pattern 910b in plan view and mirror shape 902b in cross sectional view having a single side truncated. FIG. 9C shows a footprint pattern 910b in plan view and mirror shape 902b in cross sectional view having two sides truncated.

In addition to changing the mirror radius of curvature, the aperture shape can be changed to affect the loss profile in the cavity 208. As the primary spatial dependence of the loss profile is often determined by the overlap of the lateral mode profile with the aperture shape, the shape of the aperture 104 relative to the mode defined by the curved mirror 102 can be quite important in some embodiments. Similar to changing the relative ROC values in the x and y directions, the shape of the aperture 104 can be changed to modulate the polarization preference. The mirror 102 with a $ROC_x$ of infinity and an $ROC_y$ greater than the cavity length and less than $ROCUL_y$, will, again, be used as the reference device for the following discussion of another example embodiment, but changing the aperture shape in a manner which could be used in conjunction with any of the previously mentioned changes in the mirror curvature.

Figure 10:
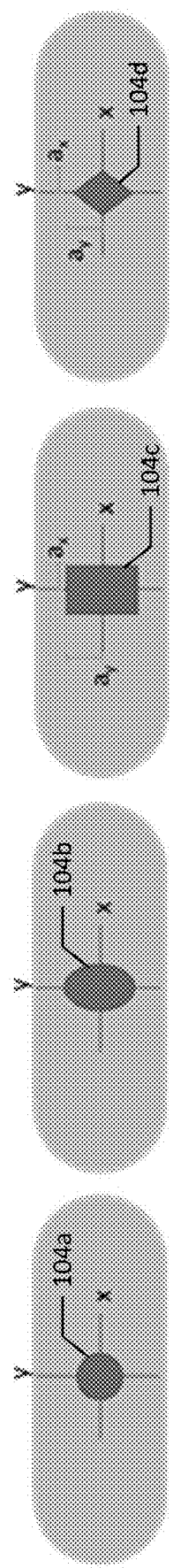
FIG. 10 provides are schematics of various example apertures for VCSEL devices in plan views, according to example embodiments of the present disclosure.

FIG. 10 provides are schematics of various example apertures for VCSEL devices in plan views, according to example embodiments of the present disclosure. An aperture shape 104a is a circle as previously described with reference to the above examples. FIG. 10 also shows an aperture shape 104b as an ellipse, an aperture shape 104c as a rectangle, and an aperture shape 104c as a diamond. The illustrated group of different aperture shapes 104a-d may be implemented with the same mirror parameters (e.g., 102a and 102b). Changing the aperture x and y dimensions affects the ROCUL in that direction, and therefore impacts the loss in that direction.

To increase the preference for the polarization direction parallel to the y-direction, an elliptical aperture shape 104b could be used where the radius of the aperture in the x direction could be reduced relative to the radius in the y direction. This would decrease $ROCUL_x$ and increase the loss seen in that direction. For example, an aperture 104b could be used with a radius in the x-direction of 1.5 μm, and 2 μm in the y-direction. Alternatively, the loss in they direction could be decreased by increasing the aperture radius in that direction ($r_y$) to increase the $ROCUL_y$, as shown in FIG. 10. For example, using an elliptical lens with an $r_x$ of 2 μm and an $r_y$ of 3 μm would increase the $ROCUL_y$ to ~1200 μm.

In addition to using smoothly curving aperture shapes, edged shapes or polygon shapes, such as rectangular aperture shape 104c, diamond aperture shape 104d, or triangular shapes could be used. These shapes could have different side lengths to modulate the loss profiles, similar to the use of an elliptic aperture shape 104b, but also have more potential for modulating the gain profile. In the previous example embodiments, the VCSEL structures were configured to adjust the mode's overlap with the net gain/loss profile by changing the mode's shape relative to the lateral loss profile while assuming a constant gain profile. However, without perfectly uniform injection, as will be the case in most practical systems, the gain profile may also vary. Typically, due to current spreading issues the current may be more concentrated at the edge of the apertures. For circularly symmetric apertures, this aspect does not provide a polarization preference, although may have a limited impact for elliptical apertures. However, controlling the current injection inhomogeneity relative to the mode shape produced by an anisotropic mirror can lead to further preference for a certain polarization. For example, the electric field is often concentrated around corners, and using a diamond shaped aperture may lead to increased injection current around the corners. By changing the angle of the corner, the electric field profile can be controlled to increase the injected current along the axis of the desired polarization to increase the polarization preference for that direction. Alternatively, the net gain/loss could be controllably decreased by such a method. For example, with reference to aperture shape 104d, where the $a_y$ of 2 μm and $a_x$ of 1.5 μm would give similar loss preference to an elliptical mirror of the same radii but may have an enhanced gain difference between the two directions due to the imperfect current injection.

The use of a curved mirror with a non-circular aperture is beneficial due to the fact that the beam shape will be heavily influenced by the mirror shape. This means that even though, for example, a rectangular aperture shape is used, the mirror shape can be chosen to keep the output beam relatively circularly symmetric. For example, for a rectangular aperture shape 104b with a $r_x$ of 2 μm and an $r_y$ of 3 μm and a corresponding $ROCUL_x$ of ~250 μm and $ROCUL_y$ of 1200 μm a mirror 102 with a constant radius of curvature of 500 μm could be chosen. This would lead to loss in the x-direction as the $ROC_x > ROCUL_x$, but would still allow for lasing parallel to the y-direction as $L < ROC_y < ROCUL_y$. In this case, the output beam could be circularly symmetric despite the rectangular aperture shape 104b, thereby retaining one of the many advantages of VCSEL devices.

For diamond shaped apertures, a different shape of the diamond (e.g., narrow, normal, wide) may provide different effects on the current distribution in the aperture 104d. The higher current areas may be provided in narrow corners, and may therefore have higher gain, which can enhance or reduce the overlap with the preferred mode. A wide corner may be a lower current area than a narrow corner, while an interior area away from any corner may be an even lower current area. Thus, to provide a neutral gain alignment, the aperture shape 104d as illustrated in FIG. 10 may have $a_x = a_y$. In this way, the central area of the aperture 104d is a lowest current area the centers of the edges is a higher current area, while the corners are a higher current area that the centers of the edges of 104d. To provide an enhanced gain alignment, the aperture shape 104d may have the $a_x > a_y$, so that the top and bottom corners have the greatest current concentration, enhancing gain. To provide a reduced gain alignment, the aperture shape 104d may have the $a_x < a_y$, so that the left and right corners have the greatest current concentration, reducing gain.

Thus, with enhanced gain alignment, the top and bottom of the aperture shape 104d has more current, while the middle has relatively less current, and conversely, with reduced gain alignment, the right and left of the aperture shape 104d has more current, while the middle has relatively less current. Other shaped apertures are similarly affected in relation to the effect the corners have on the current distribution, as would be understood by a person of skill in the art.

Figure 11:
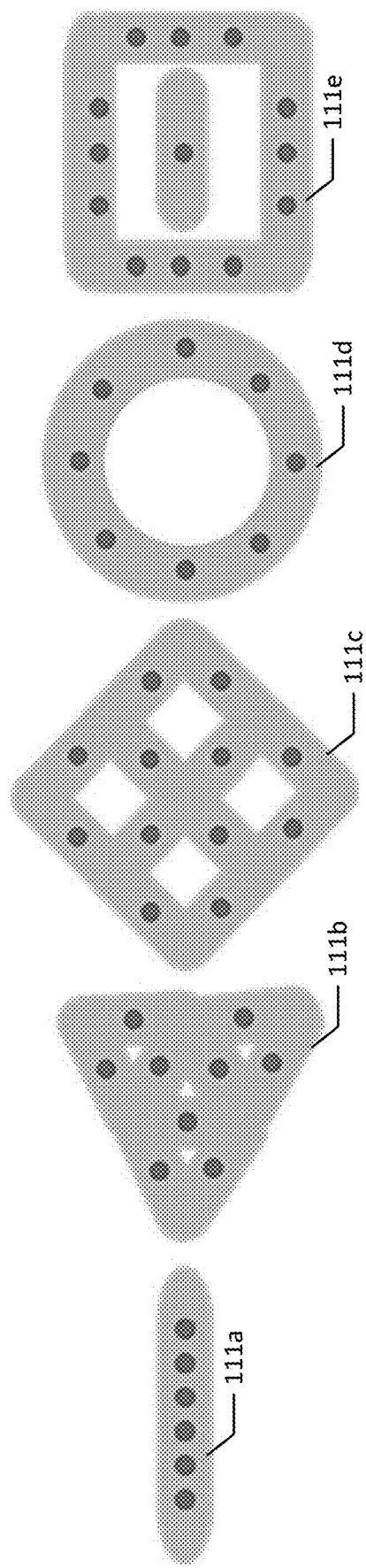
FIG. 11 is a diagram of various arrays of emitters on an interconnected mirror, according to example embodiments of the present disclosure.

The present disclosure's approach to using anisotropic mirror and/or aperture parameters to control the mode is not limited to single emitters, but lends itself well to a plurality of emitters or an array of devices using the same lens. FIG. 11 is a diagram of various example embodiments of an array of emitters on an interconnected mirror. One example for implementing a multi-emitter device is with a 1-D array 111a of VCSEL devices along the same mirror, as shown in FIG. 11. Incorporating all the devices on the same mirror can allow for smaller pitch between devices as the footprint of the end of the mirror does not need to be taken into account for the minimum device spacing. This implementation can be extended from 1-D to 2-D arrays of emitters. Depending on the desired emission properties of the array, the array symmetry can be changed. FIG. 11 shows an array 111b with triangular unit cells with emitters at regular distance from one another. Similarly, FIG. 11 shows an array 111c with rectangular unit cells with emitters at regular distance from one another. The triangular array 111b may induce three distinct polarization directions, each 60 degrees apart, whereas the rectangular array 111c may produce two directions, 90 degrees apart. The well-defined polarization direction and ratio may be advantageous for applications that want relatively equal emission from known polarizations, such as for polarization division multiplexed information transfer. Also, the number of polarizations can be increased by placing the emitters around a circular mirror. FIG. 11 shows an array 111d in a circular shape. If the emitters are relatively evenly spaced, with a spacing of $<\pi/2$ radians, then the total emission of the group of emitters may be fairly polarization independent. This implementation can reduce the speckle of the emitted light and be highly advantageous for display applications. However, the chips need not be regularly spaced, as the array 111e shows a plurality of emitters with varying pitch. These shaped arrays 111 of FIG. 11 can be tiled to create larger arrays of devices than those illustrated, and the device pitch can be changed depending on the application. For example, tiling the triangular base can be used to create a hexagonal lattice structure.

Finally, the orientation of the mirror anisotropy can be aligned with relevant crystal orientations of the device. Semipolar and non-polar based III-Nitride devices have a polarization preference parallel to the a-direction that increases with inclination angle. By aligning the mirror such that the additional loss is perpendicular to the a-direction, the preference for a single polarization can be enhanced. This may be useful for low inclination angle semipolar orientations or in the case where the device structure causes strain in the wells, changing the band structure. Alternatively, if the polarization direction is desired to be suppressed, then the mirror loss can be aligned parallel to the a-direction, though this is likely to result in a degraded device performance.

The primary effect of the invention is to allow for controlling the cavity mode loss/gain profile in VCSELs with curved mirrors, which can then be used to advantageously achieve polarization control of the devices. The mode parameters of VCSELs are determined by the overlap of different modes, defined by their lateral, longitudinal, and polarization properties, with the net gain/loss in the cavity. By increasing the loss for certain modes, those modes can be inhibited from lasing. Thus, the desired mode can be selected by accurately aligning the gain spectrum and increasing the loss for all other modes. In a curved mirror VCSEL cavity 208, the size of the beam, and therefore its overlap with lossy areas outside the aperture 104, is controlled by the mirror ROC 106. However, by using an asymmetric mirror, asymmetry in the beam shape can be introduced. This asymmetry gives a directionality to the loss profile, thereby promoting the modes with intensity oscillations in low loss direction to lase by suppressing modes that have a greater overlap in the lossy directions. Thus, modes with a single oscillation direction can be produced with the polarization direction defined based on the asymmetry in the curved mirror.

The method and structures disclosed herein uses a relatively simple change in processing to introduce anisotropic loss to the laser cavity which promotes the lasing of a single polarization parallel to the low loss direction. This minor change in processing should make adjustments to current fabrication lines simple and result in high yields with reduced cost of implementation.

This technology is material system and wavelength independent, allowing for a broad range of applicability. Additionally, by maintaining the ROC of the preferred polarization, there should be no additional loss for that mode, thereby allowing for retention of the polarization-indiscriminate device performance.

Changing the mirror shape allows for fine tuning of the polarization preference, and can be combined with adjustment of the aperture shape to enhance this preference. By aligning the mirror loss direction with a non-circular aperture, the loss can be maximized beyond what simple changes to the mirror may allow. For example, aligning a ROC=infinity direction with the smaller radius direction of an elliptical aperture would lead to additional polarization preference than for a circular aperture.

Finally, the mirror fabrication method lends itself well to making arrays of devices. The devices can be aligned along single curved mirrors or lattices to give different numbers of known polarizations. Having set polarization directions can be beneficial for applications such as polarization dependent multiplexing. If instead of a straight mirror, a curved one is used then the polarization along the lens can be smoothly rotated. Additionally, an array of devices around a toroidal mirror would have a total output that is relatively independent of polarization. This can reduce the speckle noise, which is highly beneficial for displays.

In an example embodiment, a VCSEL cavity mirror whose radius of curvature is anisotropic is configured to provide mode control. Considering the four directions +x, +y, −x, −y, the radius of curvature in at least two directions (+x, −x or +y, −y) are greater than the cavity length and less than ROCUL, and at least one of the other directions is outside this range.

In a further example embodiment, The aperture may have a circular shape, an ovular shape, a rectangular shape, or a triangular shape.

In a further example embodiment, the aperture has a shape combining (adding or subtracting) any of the previous shapes.

In a further example embodiment, the mirror has a radius of curvature along one axis that is nearly infinite (>5,000) or substantially flat, and is finite in the other and greater than the cavity length.

In a further example embodiment, the aperture is in the middle third of the lens length.

In an alternative embodiment, the aperture is in the first third of the lens length.

In another example embodiment, the mirror has a radius of curvature along at least one axis that is less than the cavity length and in the other direction(s) is greater than the cavity length and finite.

In a further example embodiment, the radius of curvature along at least one axis is concave and is convex in another direction, which corresponds to at least one direction having a positive ROC while at least one other has a negative ROC.

In another example embodiment, the devices are arrayed with multiple apertures using the same lens.

In a further example embodiment, the apertures are in a 1-D array, a triangular lattice, a rectangular lattice, in a circular pattern, and/or are placed with varying pitch In an example embodiment provided in another perspective, which is illustrated using mathematical relationships shown below, the 'S' direction corresponds to the direction that is introducing loss to the mode, the values in this direction belong in the set S, and the 'Q' direction is the direction that mirror is intended to function as normal, the values in this direction belong in the set Q.

$$L < ROC_Q < ROCUL_Q \& (ROC_s < L \ ROC_s > ROCUL_s)$$
$$S \neq \emptyset \& \ Q \neq \emptyset$$

In this example embodiment, the aperture may have any shape as discussed above.

In a further example embodiment, the ROC is expressed as follows:

$$ROC_s > 5,000 \& \ L < ROC_Q < ROCUL_Q S \neq \emptyset \& \ Q \neq \emptyset$$

In an example, the aperture may be in the middle third of the lens length. In another example, the aperture may be in the first third of the lens length.

In a further example embodiment, the ROC is expressed as follows:

$$ROC_s < L \ \& \ L < ROC_Q < ROCUL_Q S \neq \emptyset \& Q \neq \emptyset$$

In these examples, the devices may be arrayed with multiple apertures using the same lens, including for example, a 1-D array, a triangular lattice, a rectangular lattice, a circular pattern, and/or are placed with varying pitch.

Thus, the present disclosure may typically be implemented to provide the above discussed advantageous effects to improve beam characteristics by anisotropic ROC values in different directions of a curved mirror, where the curves in different directions are different from each other for example as shown in the above mathematical relationships. Additionally or alternatively, the present advantageous effects may be provided through setting an aperture shape differently in multiple directions to provide an anisotropic ROCUL in the different directions. Thus, in an alternative example, an isotropic circle curved mirror with anisotropy introduced in the aperture shape (e.g., rectangle, diamond, ellipse, or combination of shapes) may satisfy the above mathematical relationships, and similarly provide the advantageous effect as discussed above on beam properties. In this example, a VCSEL comprises an isotropic circle curved mirror and an anisotropic aperture, where the cavity length is less than a ROC, and in at least one direction (e.g., Q direction along the y axis) the ROC is less than ROCUL, and in another direction (e.g., S direction along the x axis) the ROC is either greater than ROCUL or less than the cavity length. In this example, any combination of the above discussed aperture shapes, aperture placement, and/or beam shaping properties may be present, for example, as conforming to the above noted mathematical relationships. Moreover, as noted above, any combination of beam shaping properties, including mirror curvature and aperture shape, may be combined to achieve advantageous anisotropic beam properties (e.g., focus and loss, polarization control) for a VCSEL device with a curved mirror.

It should be appreciated that the relative sizes of components within the drawings may not be to scale, and are presented merely for illustrative and explanatory purposes.

Provided hereunder are a list of numbered example embodiments:

Embodiment 1. A VCSEL device comprising: a curved mirror surface of a VCSEL; and a radius of curvature (ROC) of the curved mirror surface that is anisotropic, wherein the ROC comprises four directions, the four directions being +x, +y, −x, −y, the ROC in at least one direction is in a range greater than a cavity length of the VCSEL and less than a predefined ROC value for a standard beam width (ROCUL), and the ROC in at least one of the other directions is outside the range.

Embodiment 2. The VCSEL device according to Embodiment 1, wherein an aperture of the VCSEL has a circular shape.

Embodiment 3. The VCSEL device according to Embodiment 1, wherein an aperture of the VCSEL aperture has an ovular shape.

Embodiment 4. The VCSEL device according to Embodiment 1, wherein an aperture of the VCSEL has a rectangular shape.

Embodiment 5. The VCSEL device according to Embodiment 1, wherein an aperture of the VCSEL has a triangular shape.

Embodiment 6. The VCSEL device according to Embodiment 1, wherein an aperture of the VCSEL has a shape comprising at least two of a circular shape, an ovular shape, a rectangular shape, or a triangular shape in combination.

Embodiment 7. The VCSEL device according to Embodiment 1, wherein the ROC along a first axis is nearly infinite such that the cavity mirror is substantially flat along the axis, and the ROC along a different second axis is greater than the cavity length and finite.

Embodiment 8. The VCSEL device according to Embodiment 7, wherein an aperture is located in a middle third of the first axis.

Embodiment 9. The VCSEL device according to Embodiment 7, wherein an aperture is located in a first third of the first axis.

Embodiment 10. The VCSEL device according to Embodiment 1, wherein the ROC along a first axis is less than the cavity length and the ROC along a different second axis is greater than the cavity length and finite.

Embodiment 11. The VCSEL device according to Embodiment 10, wherein the ROC along the first axis is negative and the ROC along the second axis is positive.

Embodiment 12. The VCSEL device according to Embodiment 1, wherein a plurality of apertures are arrayed across the curved mirror surface.

Embodiment 13. The VCSEL device according to Embodiment 12, wherein the plurality of apertures are in a one dimensional array.

Embodiment 14. The VCSEL device according to Embodiment 12, wherein the plurality of apertures are placed in a triangular lattice.

Embodiment 15. The VCSEL device according to Embodiment 12, wherein the plurality of apertures are placed in a rectangular lattice.

Embodiment 16. The VCSEL device according to Embodiment 12, wherein the plurality of apertures are placed in a circular pattern.

Embodiment 17. The VCSEL device according to Embodiment 12, wherein the plurality of the apertures are placed with varying pitch.

Embodiment 18. The VCSEL device according to Embodiment 1, wherein the ROCUL is a half-power beam width.

Embodiment 19. The VCSEL device according to Embodiment 1, wherein the ROC is configured to control a mode of the VCSEL.

Embodiment 20. The VCSEL device according to Embodiment 1, wherein the laser cavity is made from GaN, InP, GaAs, or another semiconductor material.

Embodiment 21. A VCSEL cavity mirror comprising: a curved mirror surface of a VCSEL; and a radius of curvature (ROC) of the curved mirror surface that is anisotropic, wherein the ROC comprises four directions, the four directions being +x, +y, −x, −y, the ROC in at least one direction is in a range greater than a cavity length of the VCSEL and less than a predefined ROC value for a standard beam width (ROCUL), and the ROC in at least one of the other directions is outside the range.

Embodiment 22. A light-emitting device comprising the VCSEL cavity mirror according to Embodiment 21.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A vertical cavity surface emitting laser (VCSEL) device comprising:
a cavity mirror having a curved mirror surface; and
a radius of curvature (ROC) of the curved mirror surface that is anisotropic, wherein
the ROC comprises four directions, the four directions being +x, +y, −x, −y, the ROC in two directions is in a range greater than a cavity length of the VCSEL and less than a predefined ROC value for a standard beam width (ROCUL), and the ROC in two other directions is outside the range and is a value which is negative.

2. The VCSEL device according to claim 1, wherein an aperture of the VCSEL has a circular shape.

3. The VCSEL device according to claim 1, wherein an aperture of the VCSEL aperture has an oval shape.

4. The VCSEL device according to claim 1, wherein an aperture of the VCSEL has a rectangular shape.

5. The VCSEL device according to claim 1, wherein an aperture of the VCSEL has a triangular shape.

6. The VCSEL device according to claim 1, wherein an aperture of the VCSEL has a shape comprising at least two of a circular shape, an ovular shape, a rectangular shape, or a triangular shape in combination.

7. The VCSEL device according to claim 1, wherein an aperture is located in a middle third of the x+ and x− directions.

8. The VCSEL device according to claim 1, wherein an aperture is located in a first third of the x+ and x− directions.

9. The VCSEL device according to claim 1, wherein the ROC along the first axis is x+ and x− directions are negative and the ROC along the y+ and y− directions are positive.

10. The VCSEL device according to claim 1, wherein a plurality of apertures are arrayed across the curved mirror surface.

11. The VCSEL device according to claim 10, wherein the plurality of apertures are in a one dimensional array.

12. The VCSEL device according to claim 10, wherein the plurality of apertures are placed in a triangular lattice.

13. The VCSEL device according to claim 10, wherein the plurality of apertures are placed in a rectangular lattice.

14. The VCSEL device according to claim 10, wherein the plurality of apertures are placed in a circular pattern.

15. The VCSEL device according to claim 10, wherein the plurality of the apertures are placed with varying pitch.

16. The VCSEL device according to claim 1, wherein the ROCUL is a half-power beam width.

17. The VCSEL device according to claim 1, wherein the ROC is configured to control a mode of the VCSEL.

18. The VCSEL device according to claim 1, wherein the laser cavity is made from GaN, InP, GaAs, or another semiconductor material.

19. A VCSEL cavity mirror comprising:
a curved mirror surface of a VCSEL; and
a radius of curvature (ROC) of the curved mirror surface that is anisotropic, wherein
the ROC comprises four directions, the four directions being +x, +y, −x, −y,
the ROC in two directions is in a range greater than a cavity length of the VCSEL and less than a predefined ROC value for a standard beam width (ROCUL), and
the ROC in two other directions is outside the range and is a value which is negative.

20. A light-emitting device comprising the VCSEL cavity mirror according to claim 19.

* * * * *